US007828245B2

(12) United States Patent
Suisse et al.

(10) Patent No.: US 7,828,245 B2
(45) Date of Patent: Nov. 9, 2010

(54) DUAL MOTOR DUAL CONCENTRIC VALVE (75) Inventors: Brian Suisse, Crowley, TX (US); Carlos A. Fenny, Arlington, TX (US); Kim Coakley, Castaic, CA (US); George Alagozian, La Crescenta, CA (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 641 days.

(21) Appl. No.: 11/814,923

(22) PCT Filed: Jun. 27, 2005

(86) PCT No.: PCT/US2005/022916

§ 371 (c)(1),
(2), (4) Date: Jul. 27, 2007

(87) PCT Pub. No.: WO2006/088488

PCT Pub. Date: Aug. 24, 2006

(65) Prior Publication Data

US 2008/0185476 A1    Aug. 7, 2008

(51) Int. Cl.
*B64B 1/62* (2006.01)

(52) U.S. Cl. .............. 244/99.2; 244/99.5; 244/99.6; 244/227; 137/625; 137/625.65; 137/625.6; 137/899.2; 91/508; 91/511; 91/523

(58) Field of Classification Search ............. 244/99.2, 244/99.5, 99.6, 8.1, 227; 137/625, 625.67, 137/625.69, 625.65, 899.2; 91/511, 528, 91/508, 523

See application file for complete search history.

(56) References Cited

U.S. PATENT DOCUMENTS

| | | | | | |
|---|---|---|---|---|---|
| 3,613,504 | A | * | 10/1971 | Krauss | 91/22 |
| 4,534,273 | A | * | 8/1985 | Vanderlaan | 91/510 |
| 4,596,177 | A | * | 6/1986 | Biafore | 91/35 |
| 5,044,697 | A | * | 9/1991 | Longyear et al. | 303/14 |
| 5,240,041 | A | * | 8/1993 | Garnjost | 137/625.62 |

* cited by examiner

Primary Examiner—J. Woodrow Eldred
(74) Attorney, Agent, or Firm—James E. Walton; Richard G. Eldredge (57) ABSTRACT

An actuator control system has a dual concentric servo valve having a spool and at least one motor adapted to selectively displace the spool.

20 Claims, 6 Drawing Sheets

DUAL MOTOR DUAL CONCENTRIC VALVE

TECHNICAL FIELD

The present invention relates to actuator control systems.

DESCRIPTION OF THE PRIOR ART

Actuator control systems have been in use for decades, and have been used in flight control systems for aircraft for many years. In the past, aircraft have incorporated a number of different systems and methods for transferring pilot inputs into necessary mechanical outputs for controlling the aircraft. Primary flight control components typically include wheels, yokes, cyclics, pedals, throttles, and collectives. Secondary flight control components typically include flaps, slats, stabilizers, and landing gear. Some of the earliest flight control systems included pedals, sticks, and the like, which were connected to various aircraft control components via cables, wires, levers, pulleys, and/or other simple linkages and mechanisms.

Aircraft control systems that include direct mechanical linkages between the input devices and the output devices generally require significant forces on the input device to the achieve the desired actuation of the output device. Problems arise when the amount of force required to be applied to the input device poses a physical challenge to the pilot. In these situations, if the pilot cannot generate sufficient force on the input device, he can lose control of the aircraft. In efforts to assist pilots in manipulating the flight control output devices, hydraulic, pneumatic, and motorized components have been incorporated into flight control systems. Specifically, actuator control systems having dual concentric servo valves (hereinafter referred to as a DCSV) have been incorporated into flight control systems.

Figure 1:
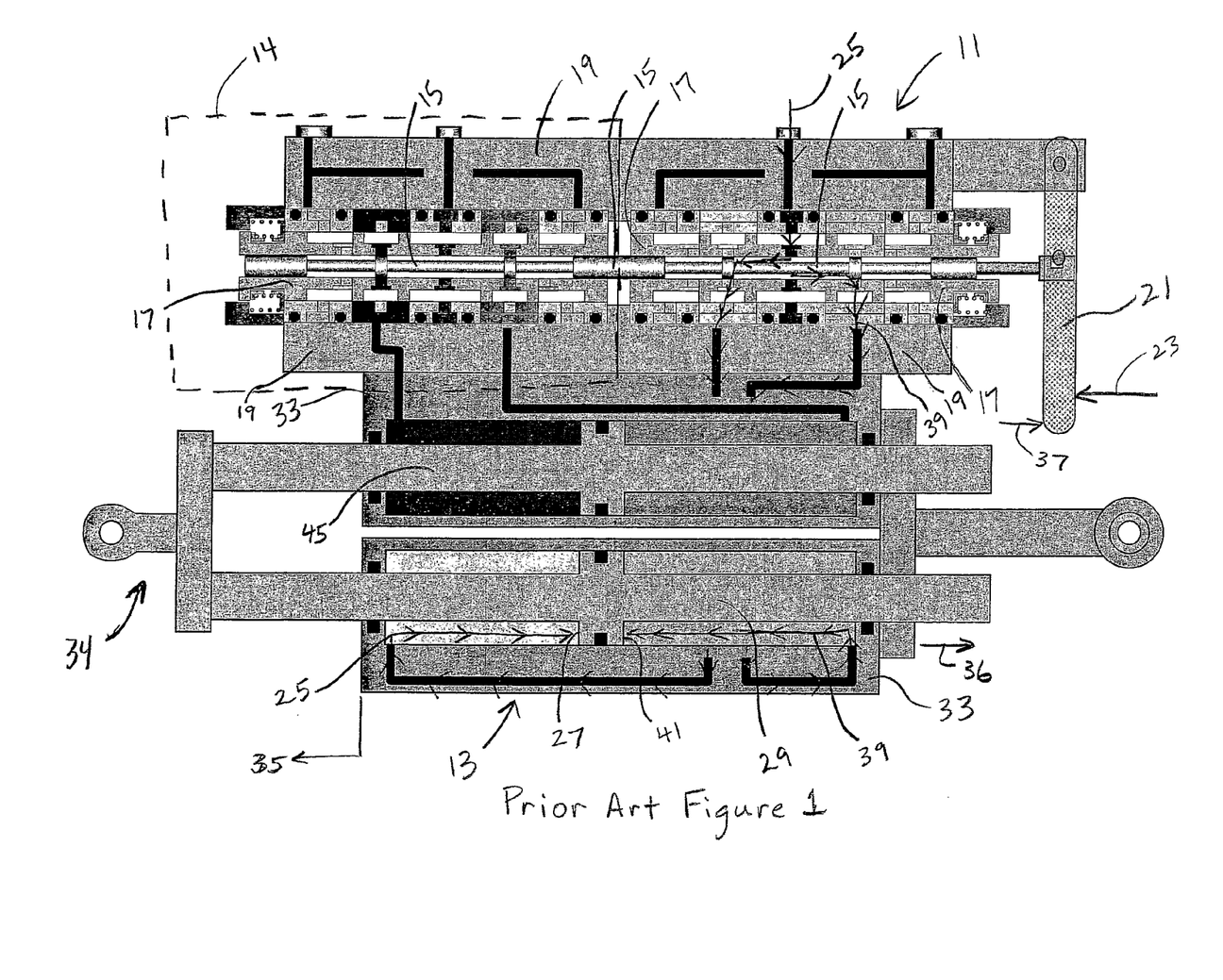
FIG. 1 is a cut-away side view of a prior-art tandem DCSV with an attached parallel piston actuator.

Referring to FIG. 1 in the drawings, a cut-away view of a prior-art hydraulically driven DCSV 11 having an attached hydraulic actuator 13 is illustrated. As those skilled in the art of hydraulic control systems will know, tandem (end to end) DCSV's are often utilized for their hydro-mechanical redundancy. This redundancy is provided through the incorporation of a secondary hydraulic system which is illustrated as being located substantially within region 14.

DCSV 11 comprises an inner primary spool 15 and an outer secondary spool 17. Primary spool 15 a piston-like structure having a varied transverse cross-section along its length. Primary spool 15 is located coaxially within an axial bore of outer secondary spool 17. Secondary spool 17 is also a piston-like structure having a varied transverse cross-section along its length. Secondary spool 17 is located coaxially within a cylindrical bore of a body 19. Primary spool 15 is movable relative to secondary spool 17, and secondary spool 17 is movable relative to body 19. As illustrated in FIG. 1, primary spool 15 and secondary spool 17 are disposed in a central position where, during operation, DCSV 11 is caused to remain substantially in a steady state with no mechanical system output.

In operation, DCSV 11 is controlled through the manipulation of a lever 21. Lever 21 is connected to primary spool 15 such that when sufficient force is applied to lever 21 in the direction indicated by arrow 23, primary spool 15 is also displaced in the direction of arrow 23. As primary spool 15 is displaced in the direction of arrow 23, a fluid path 25 is created between a fluid pressure source (not shown) and the faces 27 and 41 of a piston 29 of actuator 13, thereby producing a differential pressure across faces 27 and 41. Typically, a proximal end 34 of actuator 13 is rigidly attached to a support structure (not shown). As such, carriage 33 is displaced in the direction indicated by arrow 35.

Similarly, when sufficient force is applied to lever 21 in the direction indicated by arrow 37, primary spool 15 is also displaced in the direction of arrow 37. As primary spool 15 is displaced in the direction of arrow 37, a fluid path 39 is created between the fluid pressure source and faces 27 and 41, thereby producing a differential pressure across faces 27 and 41. As a result, carriage 33 is displaced in the direction indicated by arrow 36.

Those skilled in the art will be familiar with the fact that if primary spool 15 were to become physically lodged or otherwise fixed within secondary spool 17, DCSV 11 would continue to function in a manner similar to that described above. However, instead of fluid path 25 being created by the displacement of primary spool 15, a similar fluid path would be created as a result of the compression of centering springs and the displacement of secondary spool 17 with respect to body 19. It is also well known that DCSV 11 comprises two fully independent hydraulic systems capable of operating DCSV even in the event of a single hydraulic system failure, and that DCSV 11 may be powered by two independent hydraulic pump systems (not shown), so as to provide redundant means of operation of DCSV 11.

It is commonly known that the hydro-mechanical redundancy gained by using DCSV 11 may be maintained in a system including actuator 13 by incorporating a second piston 45 within carriage 33 and independently coupling second piston 45 to the secondary hydraulic system (as represented by region 14), while piston 29 is solely coupled to primary independent hydraulic system. Of course, each independent hydraulic system may be powered by independent and separate hydraulic pump systems (not shown).

However, the incorporation of multiple pistons 29 and 45 introduces a problem commonly referred to as a "force fight" between pistons 29 and 45. Force fights may produce undesirable bending moments throughout actuator 13 when pistons 29 and 45 are unevenly loaded by the two independent hydraulic systems. Currently, "force fight" in hydro-mechanical actuator systems is combated by closely controlled manufacturing tolerances and processes, and synchronizing the fluid porting action of primary spool 15. Incorporating such tandem DCSV's into flight control systems is commonplace. For example, it is not uncommon for a tandem DCSV and an associated hydraulic actuator to be used to actuate rudders, rotors, and a myriad of other primary and/or secondary flight control output devices.

Some flight control systems are fly-by-wire systems. Fly-by-wire systems utilize electronics and/or computers to interpret the movements of the flight control input devices and to generate corresponding electrical signals that actuate the output devices. In these fly-by-wire flight control systems, the pilot can control the aircraft using flight control input devices that are not mechanically connected to corresponding flight control output devices. As expected, because the overall reliability of fly-by-wire flight control systems increases when the electronically controlled components are inherently redundant, demand for such redundant components is high. Hydraulic actuation redundancy in fly-by-wire actuators is provided by equipping dual independent electro-hydraulic servo valves (EHSV's) and dual actuators with additional components, such as solenoid valves, bypass valves, and differential pressure sensors, to provide electrical feedback to one or more flight control computers (hereinafter referred to as FCC) and allow the FCC to compensate for the failure.

Although there have been significant advancements in the field of actuator control systems, considerable shortcomings remain.

SUMMARY OF THE INVENTION

There is a need for an improved actuator control system.

Therefore, it is an object of the present invention to provide an improved actuator control system.

This object is achieved by providing an actuator control system having a tandem DCSV coupled to an actuator, and at least one motor coupled to the tandem DCSV to drive the spools of the DCSV. The motor is preferably a torque motor.

The present invention provides significant advantages, including: (1) enabling the use of an inherently redundant tandem DCSV as a component of a fly-by-wire flight control system; (2) allowing scalable/modular redundancy through the incorporation of multiple torque motors; (3) enabling redundancy and reducing or eliminating force fights between multiple cylinder actuators by closed loop control laws, without the use of traditional added hardware, such as solenoid valves, bypass valves, and differential pressure sensors; and (4) controlling force fights between multiple cylinder actuators more efficiently than using electro-hydraulic valve spool position matching, while doing so more reliably than using pressure sensing.

Additional objectives, features, and advantages will be apparent in the written description that follows.

DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

DESCRIPTION OF THE PREFERRED EMBODIMENT

The present invention represents the discovery that motors in conjunction with a tandem DCSV may be used to provide a redundant actuator control system. It will be appreciated that although the present invention is described herein with respect to an aircraft application, the present invention is not limited to such applications. Indeed, the present invention may be used in any application in which it would be desirable to have precise control of a tandem DCSV. While the making and using of various embodiments of the present invention are discussed in detail below, it will be appreciated that the present invention provides many applicable inventive concepts, which can be embodied in a wide variety of specific contexts. The specific embodiments discussed herein are merely illustrative of specific ways to make and use the invention and do not delimit the scope of the invention.

Figure 2:
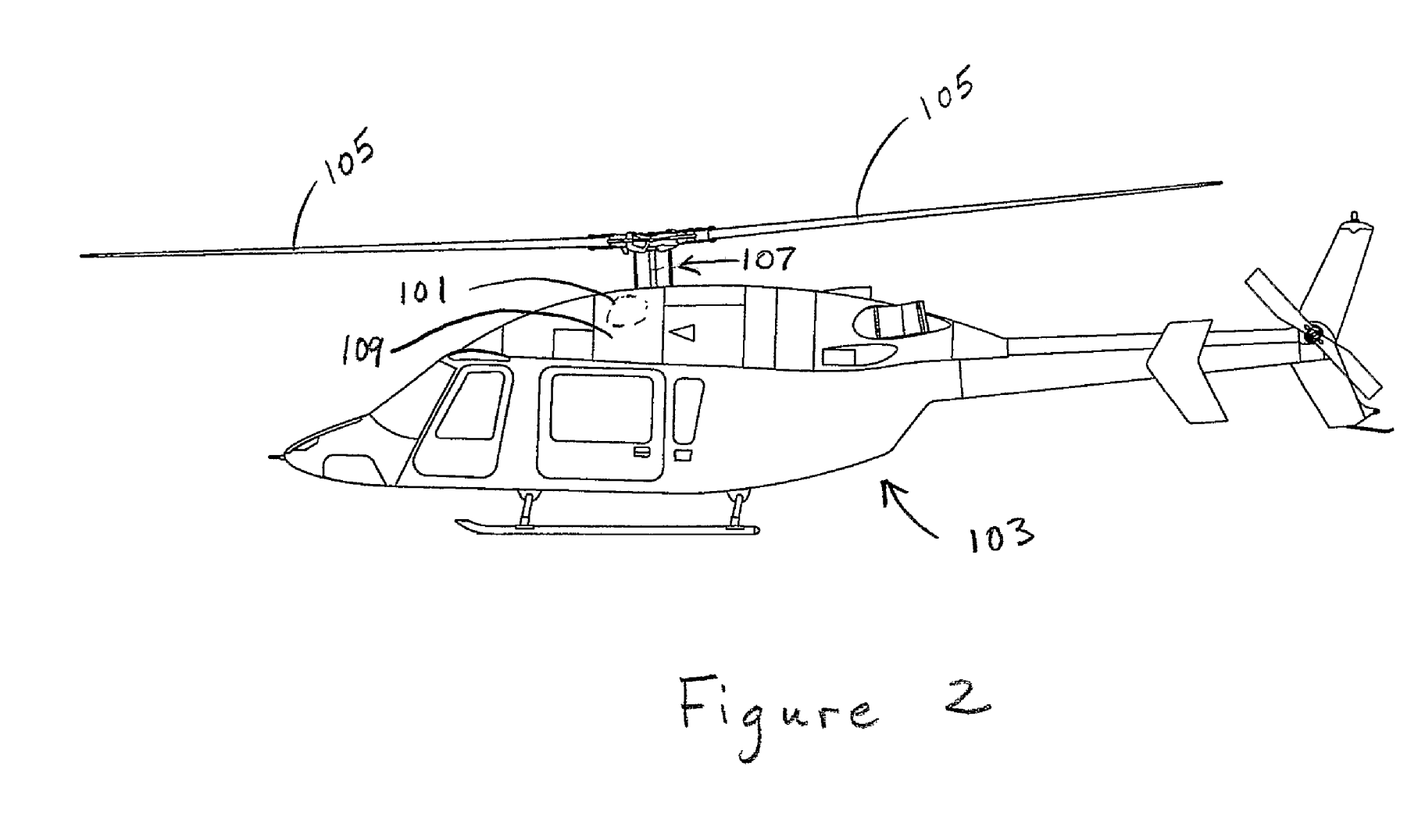
FIG. 2 is a side view of an aircraft having a dual motor dual concentric valve actuator according to the preferred embodiment of the present invention.
Figure 3:
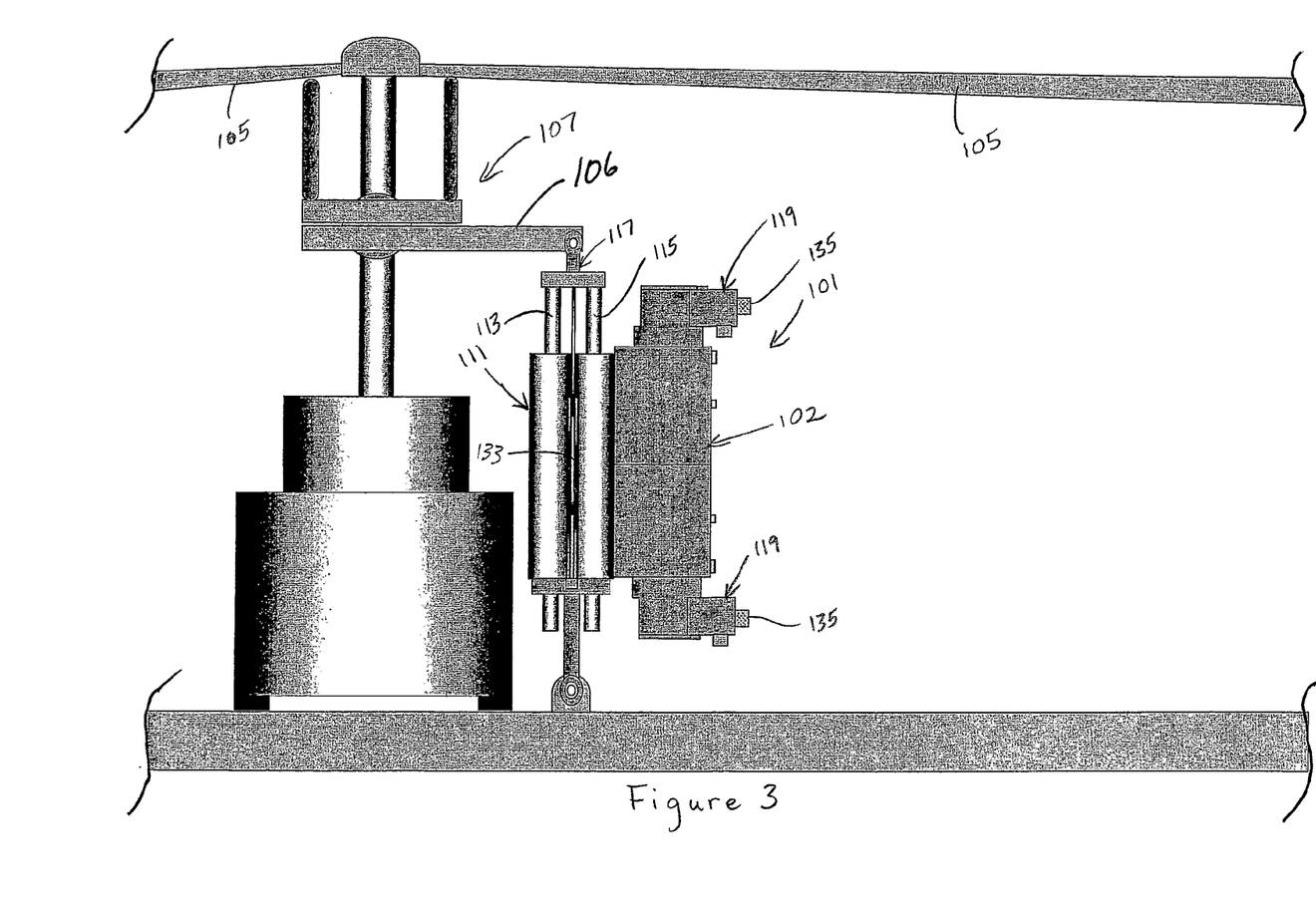
FIG. 3 is a side view of the dual motor dual concentric valve actuator of FIG. 2 as attached to a main rotor assembly according to the present invention.
Figure 4:
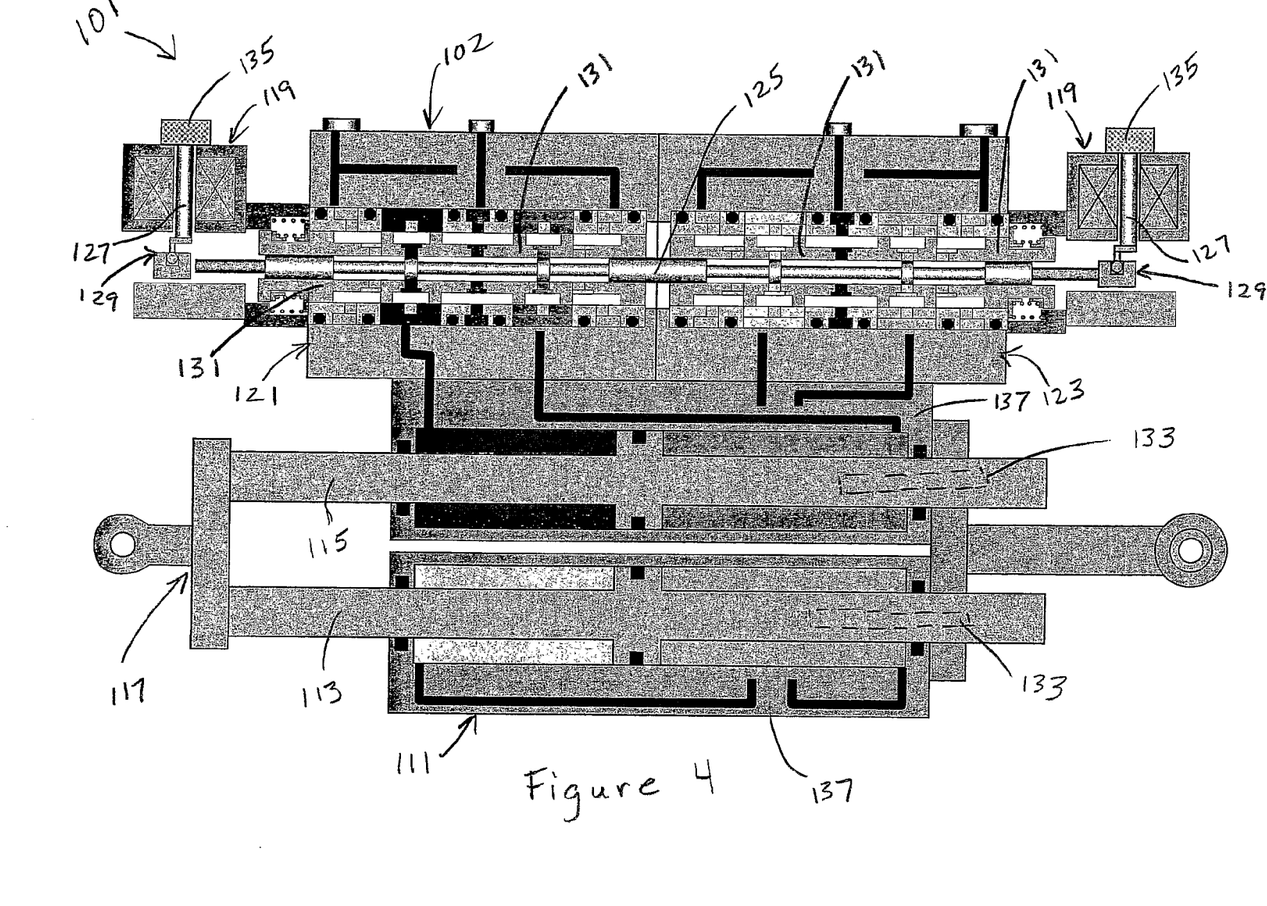
FIG. 4 is a cut-away side view of the dual motor dual concentric valve actuator of FIG. 3.

Referring now to FIGS. 2-4 in the drawings, the preferred embodiment of a dual motor dual concentric valve actuator (hereinafter referred to as DMDCVA) 101, and an exemplary aircraft or rotorcraft application therefor, according to the present invention is illustrated. FIG. 2 is a side elevational view of an aircraft, in this case, a helicopter 103, according to the present invention having DMDCVA 101. FIG. 3 is a schematic illustrating the preferred configuration for coupling DMDCVA 101 to helicopter 103. FIG. 4 is a detailed schematic of DMDCVA 101.

Referring now specifically to FIG. 2 in the drawings, DMDCVA 101 is preferably coupled to a non-rotating control assembly 106 (see FIG. 3), which allows a pilot of helicopter 103 to control the pitch of a set of main rotor blades 105 via a rotating control system 107. DMDCVA 101 is preferably disposed within a cowling 109 of aircraft 103. it will be appreciated that in other types of aircraft, DMDCVA 101 may be utilized to control and actuate a wide variety of components.

Referring now specifically to FIG. 3 in the drawings, the preferred configuration for coupling DMDCVA 101 to aircraft 103 is illustrated. As is shown, DMDCVA 101 comprises a dual concentric valve 102, a parallel dual piston actuator 111 having parallel pistons 113 and 115, at least one motor 119, at least one linear variable differential transformer sensor 133 (hereinafter referred to as LVDT), and at least one rotary variable differential transformer sensor 135 (hereinafter referred to as RVDT). In this embodiment, pistons 113 and 115 are pivotally attached at a pivot joint 117 to a non-rotating control system 106 of helicopter 103 for actuating a rotating control system 107 that is coupled to and drive main rotor blades 105. Motors 119 are preferably high-torque computer controlled electric motors. LVDT's 133 and RVDT's 135 electronically monitor the linear displacement and angular displacement, respectively, of various moving parts of DMDCVA 101. This configuration allows DMDCVA 101 to change the pitch of rotor blades 105 by controlling the actuation of rotating control system 107 via non-rotating control system 106. DMDCVA 101 is conductively coupled to at least one flight control computer (not shown), such that DMDCVA 101 may receive control signals from signals from the pilot via the FCC. Thus, it should be noted that DMDCVA 101 is not directly mechanically connected to any flight control input device and requires no actuation lever.

Referring now specifically to FIG. 4 in the drawings, a detailed schematic of DMDCVA 101 according to the preferred embodiment of the of the present invention is illustrated. DMDCVA 101 comprises at least one motor 119, preferably with one motor 119 disposed at one end 121 and a second motor 119 disposed at the opposing end 123 of DMDCVA 101. Motors 119 selectively actuate primary spool 125 of DMDCVA 101. Motors 119 are preferably high-torque computer-controllable electric motors having shafts 127. Each shaft 127 is coupled to a bellcrank-type cam 129. Cams 129 are configured to contact the ends of primary spool 125, so as to transfer the rotational displacement of cams 129 into linear displacement of primary spool 125. In the event that primary spool 125 jams, motors 119 provide sufficient torque to override the jam by causing a secondary spool 131 to displace. Motors 119 are preferably configured to be backdriven when de-energized, thereby allowing each motor 119 to continue to displace the spools, even if the other motor 119 has failed.

Motors 119 are controlled by the FCC's. LVDT's 133 and RVDT's 135 electronically monitor the linear displacement and angular displacement, respectively, of various moving parts of DMDCVA 101. Specifically, LVDT 133 monitors the linear displacement of pistons 113 and 115 with respect to a carriage portion 137 of actuator 111. The displacements of pistons 113 and 115 represent the primary system output of DMDCVA 101. It will be appreciated that while DMDCVA 101 is illustrated as comprising a parallel dual piston actuator, alternative embodiments of the present invention may include other multiple piston arrangements, such as tandem piston arrangement where tandem pistons are located substantially end-to-end relative to each other.

It should be understood that multiple LVDT's 133 may be used to monitor the linear displacement of carriage 137 with respect to pistons 113 and 115. For example, one LVDT 133 may be adapted to measure the displacement of carriage 137 with respect to piston 113, while another LVDT 133 may be adapted to measure the displacement of carriage 137 with respect to piston 115.

Further, although the location and displacement of primary spool 125 is preferably measured at both ends by RVDT's 135 associated with shafts 127 of each motor 119, it will be appreciated that LVDT's 133 associated with primary spool 125 may optionally be substituted for RVDT's 135. Thus, LVDT's 133 and RVDT's 135 may be interchanged depending upon application, availability, cost, space constraints, measurement resolution, displacement distances, and other factors.

DMDCVA 101 operates as described below. Before operation, LVDT's 133 and RVDT's 135 are preferably calibrated to a neutral position in which primary spool 125 is centrally located within valve 102, such that no resultant movement of carriage 137 occurs due to the position of primary spool 125. As the pilot provides input to a flight control input device (not shown) associated with DMDCVA 101, the FCC calculates the desired mechanical output to be achieved by DMDCVA 101 and outputs a control signal (not shown) to motors 119. The control signal causes rotational displacement of shafts 127, thereby causing cams 129 to linearly displace primary spool 125 in the selected direction. Displacement of primary spool 125 creates a fluid path between a fluid pressure source (not shown) and the internal faces of pistons 113 and 115, thereby resulting in the selected movement of pistons 113 and 115 relative to carriage 137.

The FCC uses location and/or displacement information gathered from LVDT's 133 and RVDT's 135 and to manage the output signal sent to motors 119. in the preferred embodiment, LVDT's 133 associated with carriage 137 and pistons 113 and 115 represent an outer control loop, while RVDT's 135 associated with shafts 127 represent an inner control loop. Depending upon the programming of the FCC, the FCC may continue to output a full strength control signal to motors 119 until full compliance with the desired locations of piston 113 and 115 has been achieved. However, the FCC may be programmed to output a control signal based on complex calculations, so as to prevent overshoot, abrupt stopping motions, or other undesirable control characteristics.

Figure 5:
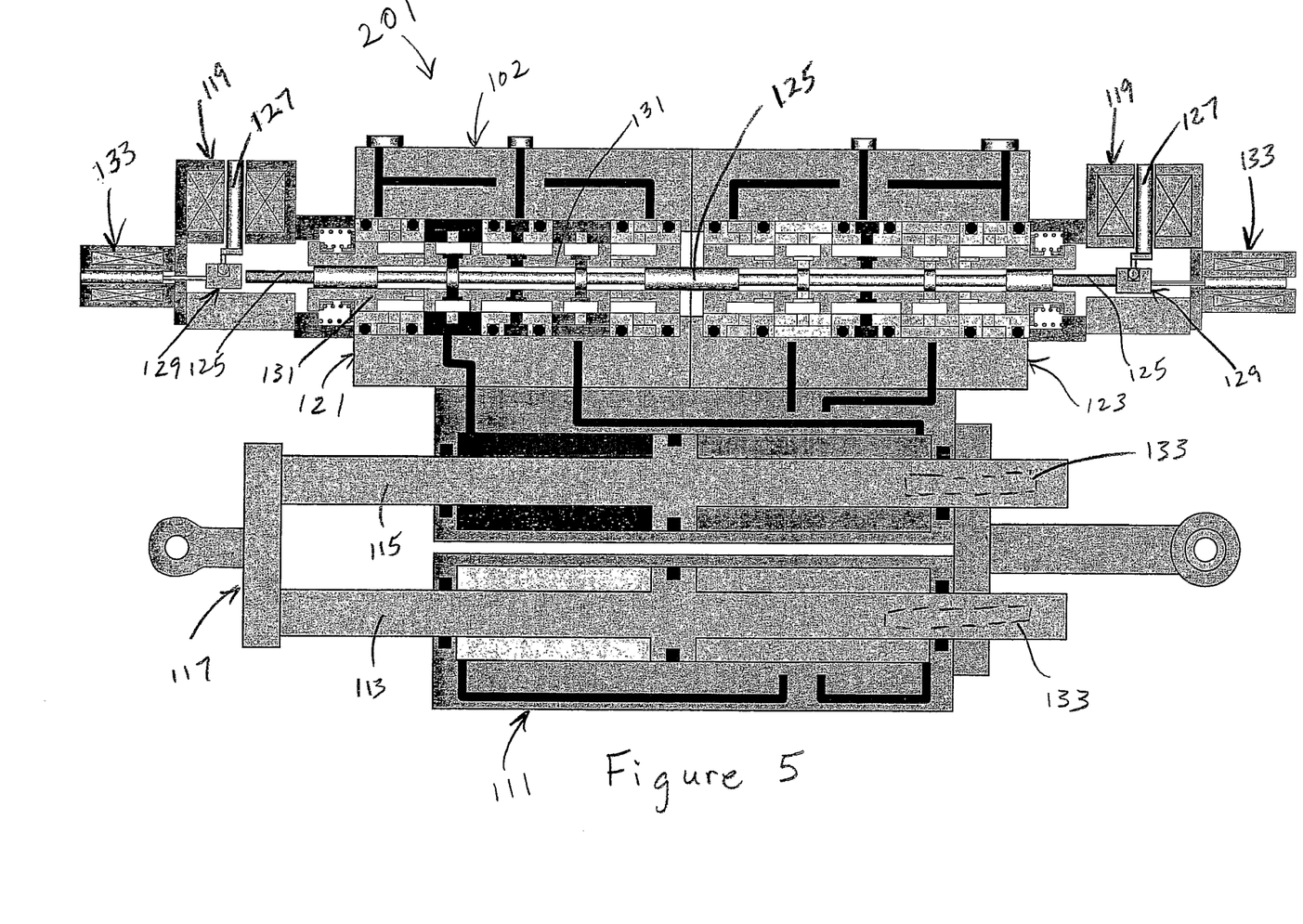
FIG. 5 is a cut-away side view of a dual motor dual concentric valve actuator having linear variable differential transformers rather than rotary variable differential controllers according to an alternate embodiment of the present invention.

Referring now to FIG. 5 in the drawings, a detailed schematic of an alternate embodiment of a DMDCVA 201 according to the present invention is illustrated. DMDCVA 201 is substantially similar to DMDCVA 101, with the exception that DMDCVA 201 comprises no RVDT's 135 to measure and/or track the displacement of primary spool 125 and the rotation of shaft 127. Instead, DMDCVA 201 measures the linear displacement of primary spool 125 and the angular displacement of shafts 127 by measuring the linear displacement of primary spool 125 with at least one LVDT 133 coupled to at least one cam 129. Otherwise, the operation of DMDCVA 201 is substantially similar to the operation of DMDCVA 101.

Figure 6:
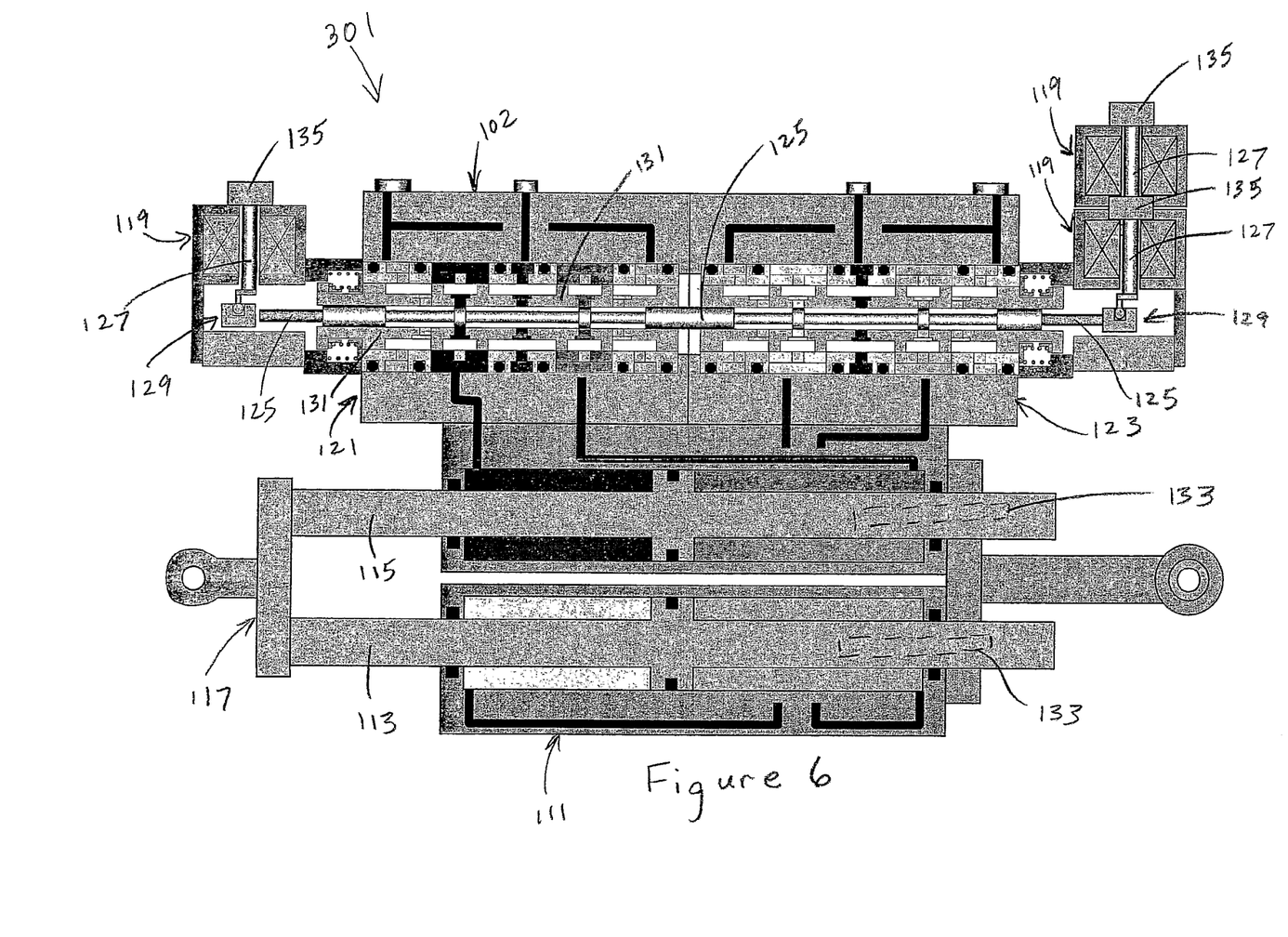
FIG. 6 is a cut-away side view of a triplex motor dual concentric valve actuator according to an alternate embodiment of the present invention.

Referring now to FIG. 6 in the drawings, a detailed schematic of a triplex motor concentric valve actuator (hereinafter referred to as TMCVA) 301 according to the present invention is illustrated. TMCVA 301 is substantially similar to DMCVA 101, with the exception that TMCVA 301 comprises three motors 119 and three RVDT's 135. TMCVA 301 preferably includes a set of two motors 119 stacked in a modular fashion, such that the two stacked motors 119 effectively share a shaft 127. In the event of a failure of one of the two stacked motors 119, the remaining operable motor 119 of the two stacked motors 119 can continue to rotate the shared shaft 127. This addition of a third motor 119 turns the system of the present invention into a triple redundant system suitable for use with "man-rated" and commercial aircraft applications. Thus, it will be appreciated that modular and scalable redundancy may be achieved by selectively incorporating additional motors 119.

It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. An actuator control system comprising:
    a dual concentric servo valve comprising:
        a first servo valve;
        a second servo valve concentrically coupled to the first servo valve; and
        a spool extending through the first servo valve and the second servo valve; and
    at least one motor coupled to the spool for selectively displacing the spool.

2. The actuator control system according to claim 1, further comprising:
    a computer for controlling the at least one motor.

3. The actuator control system according to claim 1, wherein the dual concentric servo valve is adapted to be powered by at least two hydraulic pumping systems.

4. The actuator control system according to claim 1, further comprising:
    at least one rotary variable differential transformer for sensing the location of the spool.

5. The actuator control system according to claim 1, wherein the dual concentric servo valve is adapted to control a flight control output device.

6. The actuator control system according to claim 5, wherein the flight control output device is a set of rotor blades of a rotorcraft.

7. The actuator control system according to claim 1, wherein the motor is a torque motor.

8. The actuator control system according to claim 1, further comprising:
    a dual piston actuator coupled to the dual concentric servo valve, the dual piston actuator comprising:
        a carriage assembly;
        a first piston disposed at least partially within the carriage assembly, the first piston having a first piston head attached to a first piston shaft; and a second piston disposed at least partially within the carriage assembly, the second piston having a second piston head attached to a second piston shaft.

9. The actuator control system according to claim 8, wherein the dual piston actuator is a parallel dual piston actuator, such that the first shaft is generally parallel to the second shaft.

10. The actuator control system according to claim 8, wherein the dual piston actuator is a tandem dual piston actuator, such that the first shaft is generally coaxial with the second shaft.

11. The actuator control system according to claim 8, further comprising:
   a linear variable differential transformer for sensing the location of the dual piston actuator.

12. The actuator control system according to claim 1, wherein the at least one motor comprises:
   a first motor coupled to one end of the spool; and
   a second motor coupled to an opposing end of the spool.

13. A flight control system comprising:
   a flight control computer adapted to receive a pilot input;
   at least one motor conductively coupled to the flight control computer;
   a dual concentric servo valve comprising:
      a first servo valve;
      a second servo valve concentrically coupled to the first servo valve; and
      a spool extending through both the first servo valve and the second servo valve; and
   at least one motor coupled to the spool for displacing the spool such that the spool may be selectively actuated by the flight control computer.

14. The flight control system according to claim 13, wherein the at least one motor is a torque motor.

15. The flight control system according to claim 13, wherein the at least one motor comprises:
   a first motor coupled to one end of the spool; and
   a second motor coupled to an opposing end of the spool.

16. The flight control system according to claim 13, further comprising:
   an actuator coupled to the dual concentric servo valve.

17. The flight control system according to claim 16, further comprising:
   a linear variable differential transformer for sensing the location of the actuator.

18. The flight control system according to claim 13, further comprising:
   a rotary variable differential transformer for sensing the location of the spool.

19. A method of controlling an actuator, comprising the steps of:
   providing a dual concentric servo valve comprising:
      a first servo valve;
      a second servo valve concentrically coupled to the first servo valve; and
      a spool extending through both the first servo valve and the second servo valve;
   coupling at least one motor to the spool;
   coupling the dual concentric servo valve to the actuator;
   controlling the actuator by selectively driving the motor.

20. The method according to claim 19, further comprising the steps of:
   providing at least one sensor for sensing the position of the spool; and
   sensing the position of the spool with the sensor.

* * * * *